Figure 1:
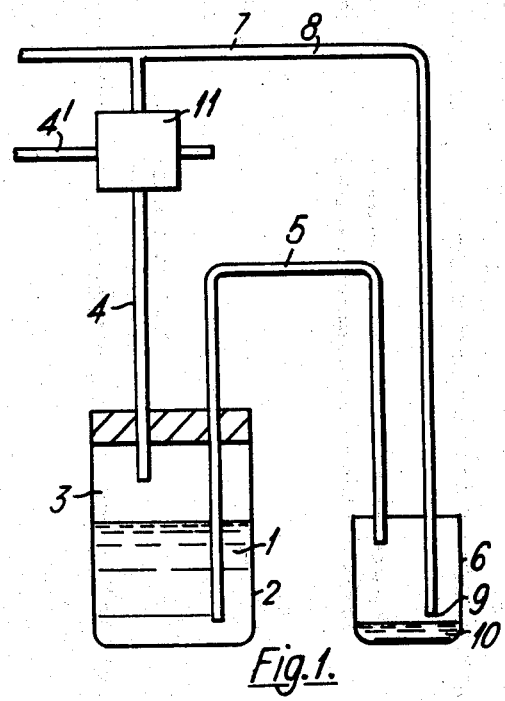

United States Patent

[11] 3,566,897

| [72] | Inventor | David Thomas Collier<br>Dunstable, England |
|---|---|---|
| [21] | Appl. No. | 822,194 |
| [22] | Filed | May 6, 1969 |
| [45] | Patented | Mar. 2, 1971 |
| [73] | Assignee | Hawker Siddeley Dynamics Limited<br>Hatfield, Hertfordshire, England |
| [32] | Priority | May 9, 1968 |
| [33] | | Great Britain |
| [31] | | 16,977/68 |

[54] CONTROLLING THE FLOW OF FLUID COOLANT
7 Claims, 3 Drawing Figs.

[52] U.S. Cl. .................................................... 137/81.5
[51] Int. Cl. ...................................................... F15c 1/04
[50] Field of Search ........................................... 137/81.5,
386, 395; 141/196, 198, 192

[56] References Cited
UNITED STATES PATENTS

| 2,668,001 | 2/1954 | Harstick ...................... | 141/196X |
| 2,796,090 | 6/1957 | Carriol ........................ | 141/198 |
| 2,843,144 | 7/1958 | Robinson et al. ............. | 137/395 |
| 3,101,770 | 8/1963 | Vant ............................ | 137/395X |
| 3,219,051 | 11/1965 | Francis ........................ | 137/395X |
| 3,360,002 | 12/1967 | Weis et al. ................... | 137/395 |
| 3,467,122 | 9/1969 | Jones ........................... | 137/81.5 |
| 3,331,380 | 7/1967 | Schonfeld et al. ............ | 137/81.5 |

FOREIGN PATENTS

| 101,546 | 7/1937 | Australia ..................... | 141/198 |
| 746,607 | 3/1956 | Great Britain ................ | 141/198 |
| 1,446,272 | 6/1966 | France ......................... | 141/198 |

*Primary Examiner*—Samuel Scott
*Attorney*—Dowell & Dowell

ABSTRACT: Apparatus for transferring a readily evaporable liquid, by gas pressure, from a first container to a second container, wherein a dip tube monitors the level of the liquid in the second container and the pressure signal in the dip tube is transmitted to a fluidic control device which controls the application of gas pressure to the liquid in the first container. The fluidic control device also receives a second control signal from the tube conveying the liquid from the first to the second container, and receives its main gas supply from the same source as that which supplies the gas pressure to the first container.

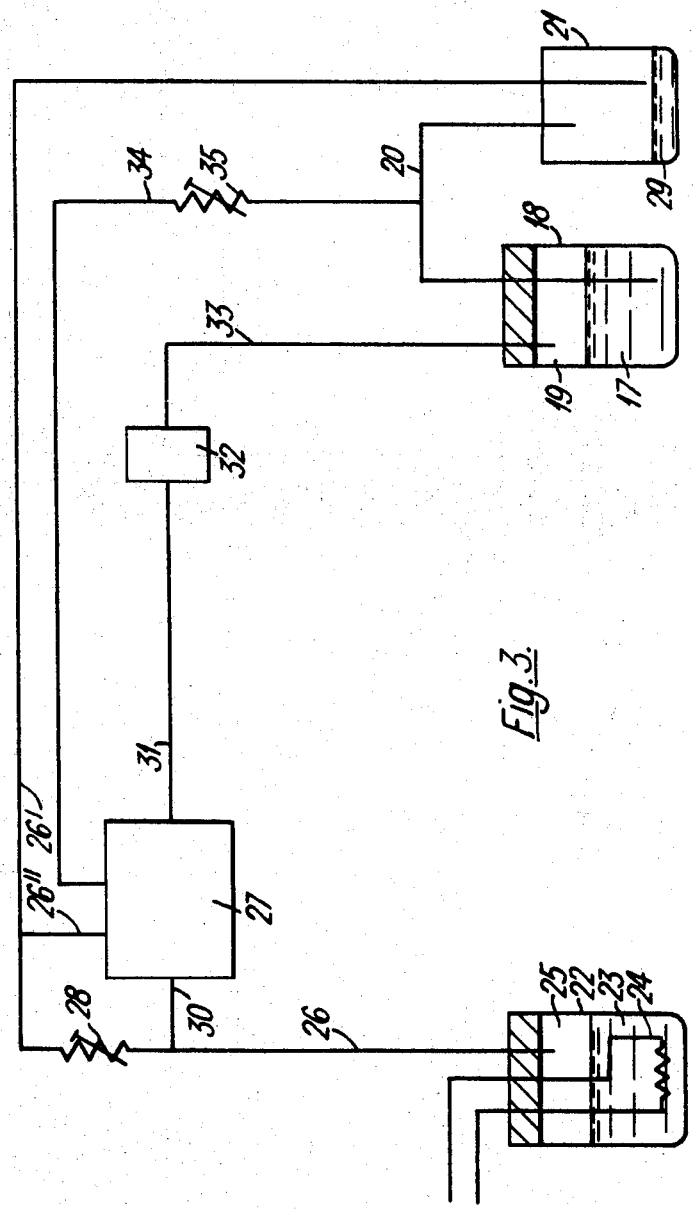

CONTROLLING THE FLOW OF FLUID COOLANT

This invention relates to the transfer of a coolant liquid from a reservoir via a pipe to a vessel whereby equipment in close proximity to the said vessel is cooled by the relatively rapid evaporation of the liquid.

In apparatus of this type it is desirable that the liquid should not be delivered in quantities in excess of those necessary to maintain the required temperature in the equipment being cooled. It is also desirable that transfer of the liquid should be as rapid as possible. It is an object of this invention to provide an apparatus in which cooling liquid is supplied as required at a relatively high rate.

According to the invention there is provided an apparatus whereby a readily evaporable liquid is discharged under pressure from a first container into a second container, it being arranged that at a present level the liquid in the second container closes the end of a control tube through which flows a gaseous fluid, whereby said gaseous fluid is increased in pressure and this increase in pressure operates switching means to release the pressure from the first container.

The open end of the control tube may be at least partly closed with an absorbent material, to lengthen the cycling time of the apparatus.

Figure 2:
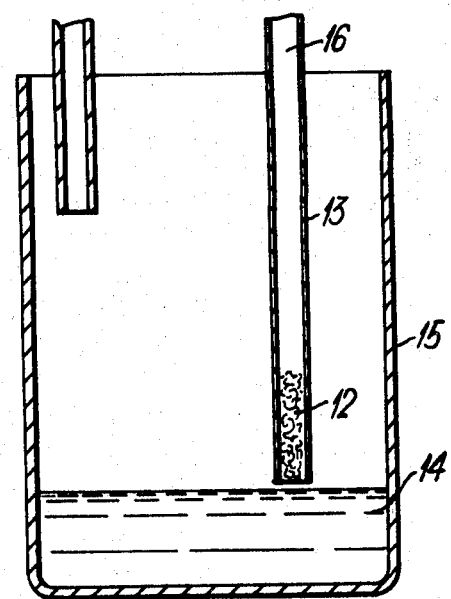

Apparatus in accordance with the invention will now be described by way of example, with reference to the accompanying drawings in which:

FIG. 1 shows a simple version of such apparatus;
FIG. 2 illustrates a modification of the apparatus of FIG 1; and
FIG. 3 shows an embodiment employing pure fluid logic.

With reference to FIG. 1, a liquid 1 within a first container 2 is subjected to pressure from a gas 3 supplied by pipes 4, 4' whereby the liquid 1 is discharged via a pipe 5 into a second container 6. A gas 7 is supplied via a control pipe 8 whose open end 9 is adjustable for height relative to the surface of the liquid 10 in the second container 6. Associated with the pipes 4, 4', 8 is a switching means 11. When the fluid 10 in the container 6 rises to cover the open end 9 of the pipe 8, the resulting increase in pressure of the gas 7 in the pipe 8 operates the switching means 11 to shut off the supply of gas via pipe 4' and to release the pressure from the container 2 via pipes 4, 4' to atmosphere. In an alternative and preferred arrangement the pressurizing gas 3 in the container 2 is provided by vaporization of the liquid 1, and there is no separate supply of gas via pipe 4'.

It may be desired to lengthen the cycling time of the apparatus previously described with reference to FIG. 1. For this purpose the open end of the control pipe may be at least partly closed with an absorbent material. Such an arrangement is shown in FIG. 2 in which the absorbent material 12 is contained within the end of the control pipe 13.

When the absorbent material 12 is wetted by the liquid 14 within the container 15 the gas 16 within the sensing pipe 13 will remain at an increased pressure after the level of the liquid 14 has fallen, until the absorbent material has dried out.

The switching means associated with venting of the apparatus previously described will preferably comprise one or more devices of the type known as pure fluid amplifiers or logic elements. An example of the apparatus which includes a pure fluid logic element is shown diagrammatically in FIG. 3 in which a liquid 17 within a container 18 is pressurized by its own vapor 19 so as to be forced via a pipe 20 into a second container 21. A third container 22 contains a supply of an identical or similar liquid 23 which is vaporized by means of a heater 24 to provide a gas 25 under pressure which is supplied via a pipe 26 to one input 30 of a pure fluid amplifier 27. A proportion of the gas 25 is also supplied via a variable restrictor 28 and a control pipe 26' to the second container 21. The control pipe 26' may be made adjustable relatively to the surface of the liquid 29 within the second container 21. The open end of the pipe 26' may be at least partly closed with absorbent material as previously described. A branch 26'' of the pipe 26' allows the pressure of the gas in pipe 26' to control the flow of gas leaving the output 31 of the fluid amplifier 27. The amplified variations in the gas pressure control a valve 32 whereby the gas 19 in the container 18 is vented to atmosphere via a pipe 33. The preferred form of the valve 32 will embody additional amplification, as for example a diaphragm valve. A proportion of the gas in the pipe 20 is diverted along a pipe 34, as determined by a variable restrictor 35, and provides a further signal input to pure fluid amplifier 27 thereby controlling venting of the gas 19 along the pipe 33 through the diaphragm valve 32 so as to limit the pressure of gas 19 in the container 18.

I claim:

1. Apparatus whereby a readily evaporable liquid is discharged under pressure from a first container into a second container, it being arranged that at a preset level the liquid in the second container closes the end of a control tube through which flows a gaseous fluid, whereby said gaseous fluid is increased in pressure and this increase in pressure operates switching means to release the pressure from the first container.

2. Apparatus according to claim 1, wherein the open end of the control tube is at least partly closed with an absorbent material.

3. Apparatus according to claim 1, comprising a fluid logic system to bring about the switching in response to increase of pressure in the control tube.

4. Apparatus according to claim 3, wherein the working fluid employed in the fluid logic system, and the gas in the control tube, are the same as the gas resulting from vaporization of the liquid being transferred from the first to the second container.

5. Apparatus according to claim 3, wherein the pressure in the control tube is applied as an input control signal to a pure fluid amplifier the output from which in turn controls venting of gas from the first container.

6. Apparatus according to claim 5, wherein a gas supply for the control tube, and a supply for the fluid amplifier, are both derived from a third container.

7. Apparatus according to claim 4, wherein there is applied, as a further control signal input to the fluid amplifier, a proportion of the pressure in a transfer pipe between the first and second containers.